Aug. 18, 1970  R. G. MILLER  3,524,484
ADJUSTABLE NOSEPIECE FOR POWER SCREWDRIVER
Filed May 1, 1968  2 Sheets-Sheet 1
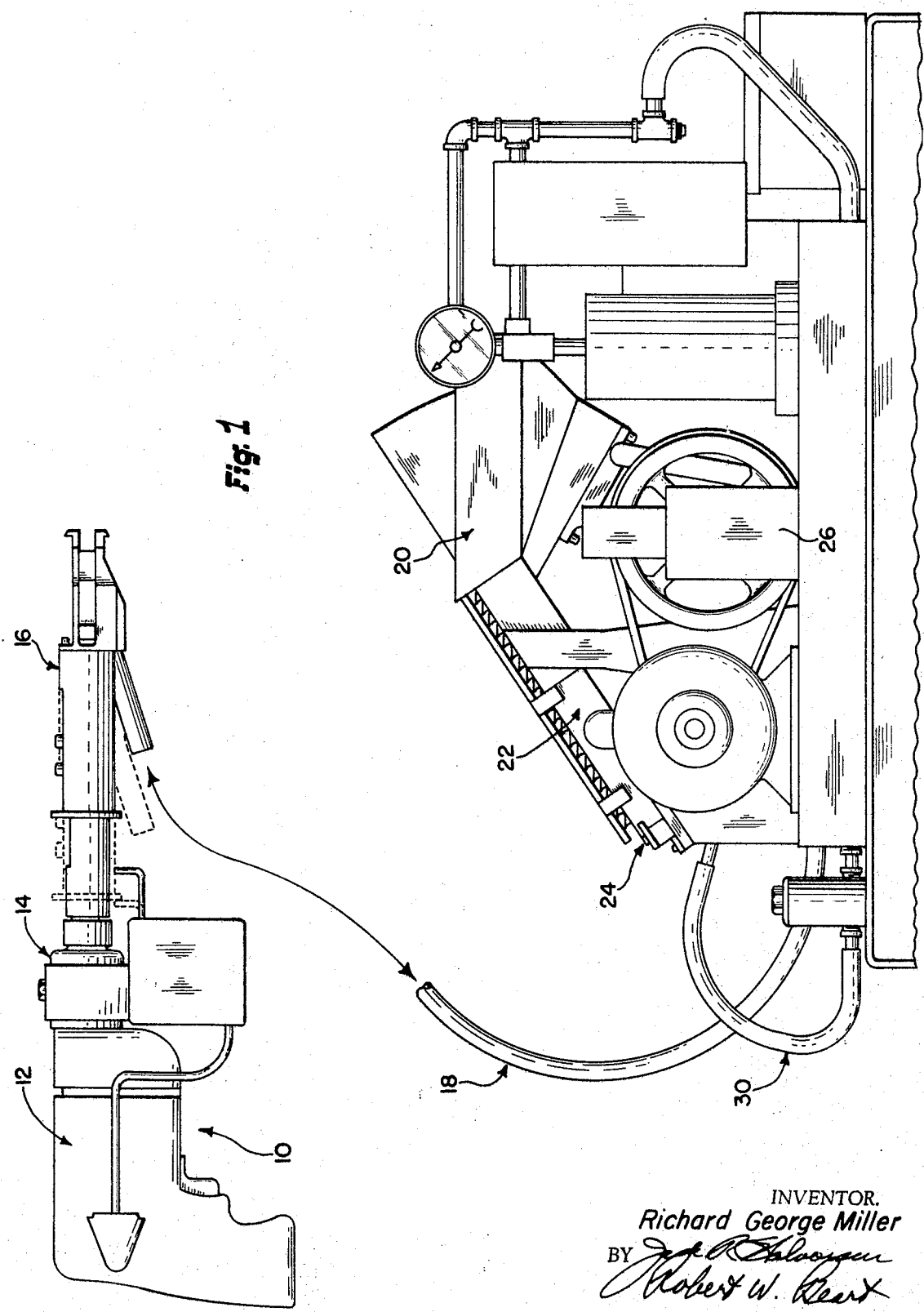
INVENTOR.
Richard George Miller
BY
His Att'ys Aug. 18, 1970  R. G. MILLER  3,524,484
ADJUSTABLE NOSEPIECE FOR POWER SCREWDRIVER
Filed May 1, 1968  2 Sheets-Sheet 2
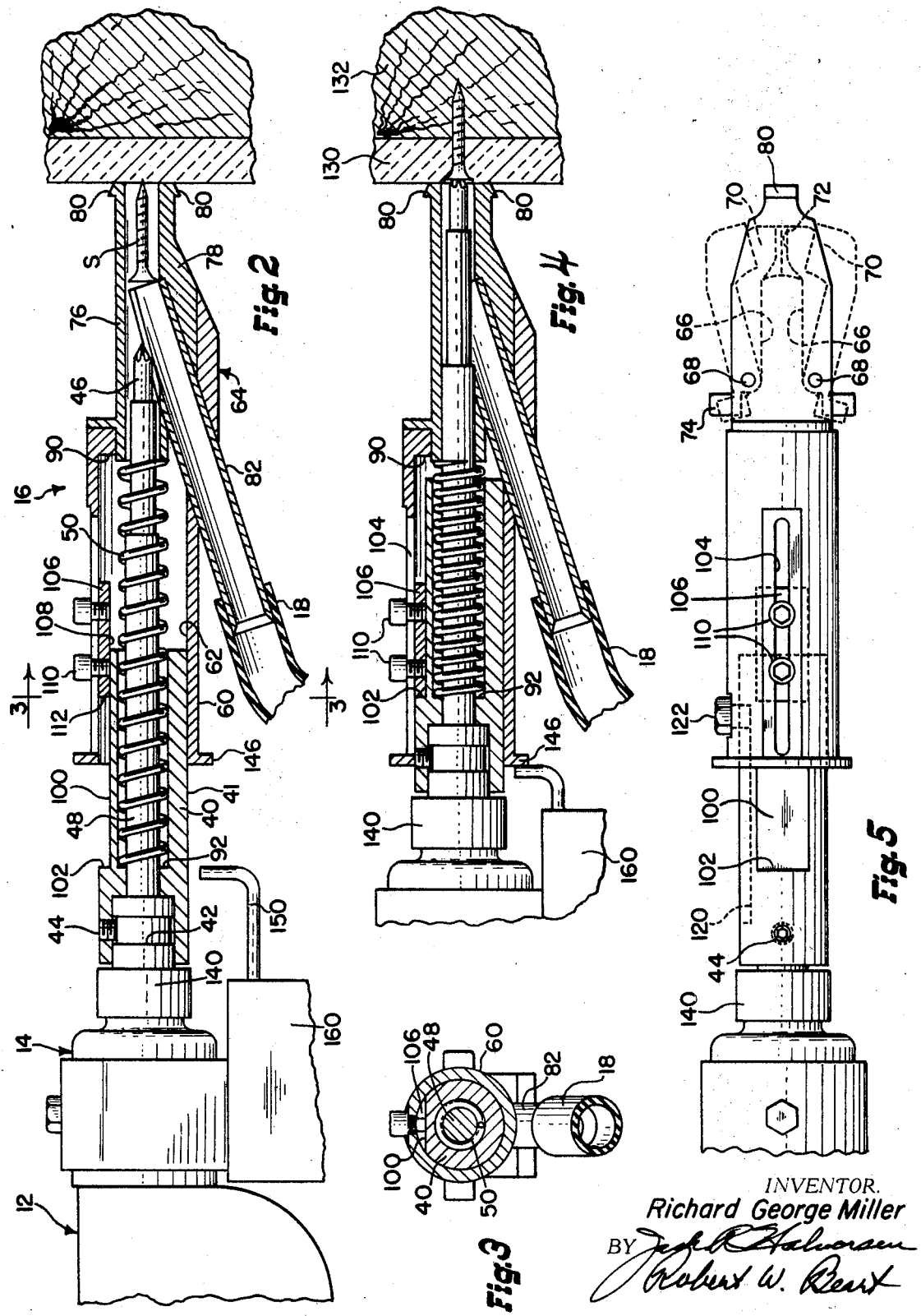
INVENTOR.
Richard George Miller
His Att'ys United States Patent Office 3,524,484
Patented Aug. 18, 1970

3,524,484
ADJUSTABLE NOSEPIECE FOR
POWER SCREWDRIVER
Richard George Miller, Elgin, Ill., assignor to Illinois Tool Works Inc., Chicago, Ill., a corporation of Delaware
Filed May 1, 1968, Ser. No. 725,770
Int. Cl. B25b 23/10
U.S. Cl. 144—32        6 Claims

ABSTRACT OF THE DISCLOSURE

This invention relates to a nosepiece for a portable power screwdriver and an external adjustment means for controlling the position of the driver bit within the nosepiece to thereby adjustably fix the depth to which a screw will be driven into a workpiece by said bit.

BACKGROUND OF THE INVENTION

The field of art contemplated by this invention relates to portable power screwdrivers for driving the heads and shanks of screws into a workpiece to a predetermined depth above or below the surface of such a workpiece and more specifically relates to a simplified means for adjusting the depth gauging means. Previously, many complex arrangements requiring special tools or complete dismantling of a nosepiece was necessary to make a minor adjustment of the axial positioning of a driver bit relative to the portion of the nose piece contacting the workpiece.

SUMMARY

The invention primarily relates to an adjustable means for controlling the depth to which a driver bit in a portable power driven screw driver will drive a mating screw into a workpiece. More specifically it contemplates a simple device which can be adjusted totally externally of the nosepiece of a driver in a quick and simple fashion.

One form of driver to which the invention can be applied is a power driver having a nosepiece consisting of axially telescoped sleeves which are axially movable relative to one another but which are nonrotatable relative to one another. The free end of the outermost sleeve may have a pair of jaws adapted to sequentially accept a series of screws from a gravity or pneumatically fed tube means which places individual screws sequentially between the jaws and which are axially extended through and out of the jaws by a driver bit fixed relative to one sleeve and axially movable relative to the other sleeve with the axial movement of the second sleeve determining the final position of the driver bit and thereby predetermining the degree to which a screw being driven will be located relative to the workpiece into which it is being driven. The adjustment of the device takes place wholly externally from a readily available surface of the driver nosepiece.

DRAWINGS

FIG. 1 is an elevational view of the type of driver incorporating the teachings of the present invention and showing, schematically, means for sequentially delivering screws to the nosepiece of the driver;

FIG. 2 is an elevational view in partial section of the present invention with a screw in position for driving;

FIG. 3 is a view in section taken along lines 3—3 of FIG. 2;

FIG. 4 is a device of the type shown in FIG. 2 with the driver in its final position; and FIG. 5 is a partial plan view of the device shown in FIG. 2.

DESCRIPTION OF THE PREFERRED EMBODIMENT

Referring now to the drawings wherein similar numerals will be used to designate similar parts a driver 10 incorporating the teachings of the present invention normally includes a power means 12 such as an electric or pneumatic motor, clutch means 14 and a nosepiece 16. Screws are delivered to the nosepiece 16 via a pneumatic tube 18 with the screws initially being segregated from a hopper 20 to a track 22 and a metering means 24. The metering means 24 sequentially delivers a screw to the pneumatic tube 18 and a burst of compressed air is provided from the compressor 26 through connecting tube 30 to chase the screw through tube 18 to a nosepiece 16. Similar devices are well known in the art.

The present invention is concerned more specifically with a simplified easy to operate adjustment means for controlling the depth to which a screw will be driven into the workpiece. Referring now to FIGS. 2 through 5, the nosepiece 16 includes a first sleeve member 40 fixed to the nose of the driver 12 in a nonrotatable and axially fixed relationship as by means such as a slot 42 and set screw 44. Extending outwardly from the hose 14 and rotatable relative thereto is a driver bit 46 and its axial extension 48. Surrounding the axial extension 48 is a coil spring 50 for purposes best set forth hereinafter.

Surrounding sleeve 40 and extending axially outwardly away from the driver is a second sleeve 60 which has its inner wall 62 complementary to the outer wall 41 of the first sleeve 40 so that the two sleeves can be axially telescoped. At the free end of sleeve 60 there is provided a jaw assembly 64 which includes a pair of complementary jaws 66 which are pivoted at one end, as at 68 and having at their opposite ends inwardly directed portions 70 with the opposed internal faces 72 being complementary to the configuration of screws adapted to be accepted therein. Spring means 74 located on the opposite side of pivots 68 tend to retain the jaws in normally closed relationship. Located above and below the opposed jaws 66 are a pair of plate like members 76 and 78. Each of these members 76–78 at their free extremity are provided with generally flat laterally extending feet 80 which are adapted to provide a stable bearing means when the end of the nosepiece is brought into engagement with a workpiece. The lower plate 78 has a tubular passageway 82 which is disposed at a small acute angle relative to the axis of the nosepiece and at one end is acceptable within the free end of tube 18 opposite the metering device 24 and with the opposite end of 82 communicating with the bore of sleeve 60.

It will be noted that the proportionate relationship of the axial length of the extension 48 and bit 46 permit a screw S to be chased through the tube 18 into the chamber formed by the bore of the sleeve and jaws 66 to be temporarily retained there. The portion of sleeve 60 adjacent the plates 76-78 and the jaws 66 is reduced as at 90 to provide a shoulder or abutment against which one end of the coil spring 50 will bear while the spring 50 at its opposite end bears against shoulder 92 provided within the first sleeve 40.

The upper surface of sleeve 40 preferably has a planar recess 100 extending through a substantial portion of its length from its free end to a point adjacent its attachment to the nose 14. This termination is abrupt and forms a shoulder or abutment 102. Sleeve 60 is slotted as at 104 and carries an adjustable block 106 which on one side is complementary to the internal wall of sleeve 60 and on the opposite side 108 is planar and complementary to the planar surface 100 of sleeve 40. Adjustable fastening means 110 such as set screws engage the block 106 and adjustably retain it in fixed relation to outer sleeve 60. Thus, block 106 presents an abrupt shoulder or stop 112 at one end for engagement with the shoulder 102 as will be seen hereinafter.

In the preferred embodiment the first or inner sleeve 40 is provided with a slot 120 extending axially along its length and adapted to accept suitable means such as a stud or set screw 122 extending through the outer sleeve 60 to prevent relative rotation but permit axial movement between the sleeves 40 and 60. Stud 122 serves as a stop means at the outer extremity of slot 120 to control the extent to which spring 50 can move sleeve 60 relative to sleeve 40.

In the operation of the present device a screw is chased by a burst of air through the tube 18 into the jaws 66. The feet 80 are positioned against a first workpiece 130, such as gypsum board for attachment to a secondary member such as a wood stud 132. Rotation of the driver bit is commenced and axial pressure applied to the driver 12 which compresses spring 50 and brings the bit 46 into engagement with the complementary driving means of screw S. Driving of the screw is continued until shoulder 112 of block 106 is brought into engagement with the shoulder 102 of sleeve 40. At this point continued axial pressure into the gun 12 results in an axial force being directed through the feet 80, shoulders 112 and 102 and the connection at 42–44 to be applied to a known clutch means 140 to stop rotation of the driver bit 46. In the use of screw members such as is shown in United States Letters Patent No. 3,056,234 it has been found desirable to embed the head of the screw slightly below the outer surface of the gypsum board 130 to permit spackling with plaster like materials to cover up the screw heads. In the event that the bit 46 which has driven the screw through the jaws 66 and move them laterally to the dotted position shown in FIG. 5 does not properly embed the screw in the workpiece the operator then merely requires a loosening of the fasteners or set screws 110 to move the block 106 so that the relative position of the parts can be adjusted to the desired relationship. Upon release of the pressure the clutch 140 is re-engaged and the spring 50 moves the sleeve 60 with its associated passageway 82 outwardly away from the driver to a position where the passageway 82 will clear the bit 46 and permit the sequential introduction of another screw between the jaws. Sleeve 60 has means such as flange 146 provided at its inner extremity for engagement with a movable rod 150 connected to a signal generating means or switch 160 to control the metering means 24 for delivery of another screw S to the nosepiece for driving.

While other embodiments will be apparent to those skilled in the art it is intended that the present invention be limited only by the appended claims.

I claim:

1. In a portable power screw drive including power means and a rotatable bit, means to deliver screws sequentially into axial alignment with said bit, retaining means to grip an individual screw as delivered, means to permit movement of the screw retaining means relative to the rotatable bit whereby the bit is brought into engagement with the screw, adjustable means for limiting the movement of the retaining means relative to the bit whereby the screw will be projected axially out of the retaining means by the bit a predetermined amount, said adjustable means being controllable totally from the exterior of the driver, said adjustable means to limit movement including a first non-rotatable sleeve axially fixed at one end to the nose of said power means with the rotatable bit extending axially through and beyond the free extremity of said sleeve, a second sleeve axially movable but non-rotatable relative to said first sleeve, said bit normally enclosed by said second sleeve, said screw retaining means carried by said second sleeve adjacent its free extremity, said adjustable means including an axially movable abutment secured to said second sleeve and adapted to cooperate with shoulder means on said first sleeve whereby the amount of axial movement of said bit within said second sleeve is controllable.

2. A device of the type claimed in claim 1 wherein the retaining means for holding a screw includes a pair of spring loaded pivoted jaws having opposed faces complementary to the type of screw to be held, said jaws adapted to be swung apart to permit axial ejection of a screw by movement of said bit towards and accommodation between said opened jaws.

3. A device of the type claimed in claim 2 wherein said second sleeve at its free extremity includes a pair of laterally oppositely extending feet which are disposed between and extend axially beyond said jaws whereby said feet engage a workpiece and provide a stable bearing means for movement of said second sleeve relative to said first sleeve.

4. A device of the type claimed in claim 1 wherein said adjustable means further including a slot in said second sleeve, said axially movable abutment being a block having one side complementary to the interior of said second sleeve and a planar opposite face, fastener means extending and accessible through said slot and movably fixing said block to said second sleeve, said second having its inner wall complementary to the outer wall of said first sleeve, said first sleeve having an axially extending planar portion complementary to and adapted to slidingly engage with the planar face of said block, said planar portion terminating at its end closest to the nose of the driver in an abutment which is contractable by an end of said block to limit the movement of said second sleeve relative to said first sleeve and thereby adjustably position said bit within said sleeve.

5. A device of the type claimed in claim 4 wherein said first sleeve is provided with an axially extending means cooperable with means on said second sleeve to permit axial relative movement between said sleeves but restraining said sleeves against relative rotation.

6. A device of the type claimed in claim 5 wherein one of said sleeves is axially slotted and the other sleeve has means to cooperate with said slot.

References Cited

UNITED STATES PATENTS

| 2,657,721 | 11/1953 | Shaff | 144—32 |
| 2,940,488 | 6/1960 | Riley | 144—32 |
| 2,790,471 | 4/1957 | Graybill | 144—32 |

DONALD R. SCHRAN, Primary Examiner

U.S. Cl. X.R.

145—52

Disclaimer

3,524,484.—*Richard G. Miller*, Elgin, Ill. ADJUSTABLE NOSEPIECE FOR POWER SCREWDRIVER. Patent dated Aug. 18, 1970. Disclaimer filed July 18, 1983, by the assignee, *Illinois Tool Works, Inc.*

Hereby enters this disclaimer to claims 1 and 2 of said patent.

[*Official Gazette September 20, 1983.*]